United States Patent [19]

Harrison

[11] 4,418,370

[45] Nov. 29, 1983

[54] BAND DRIVE ACTUATOR

[75] Inventor: Joel N. Harrison, Campbell, Calif.

[73] Assignee: Xerox Corporation, Stamford, Conn.

[21] Appl. No.: 321,866

[22] Filed: Nov. 16, 1981

Related U.S. Application Data

[63] Continuation of Ser. No. 100,580, Dec. 5, 1979, abandoned.

[51] Int. Cl.³ .............................................. G11B 5/56
[52] U.S. Cl. .................................... 360/106; 360/109
[58] Field of Search .......... 360/106, 109, 78, 104–105, 360/97–99

[56] References Cited

U.S. PATENT DOCUMENTS

| 3,643,242 | 2/1972 | Bryer | 360/106 X |
| 3,721,967 | 3/1973 | Englert et al. | 360/106 |
| 3,881,189 | 4/1975 | Mayeda | 360/106 |
| 3,922,720 | 11/1975 | Caletti et al. | 360/106 |
| 4,161,004 | 7/1979 | Dalziel | 360/106 |

Primary Examiner—John H. Wolff

[57] ABSTRACT

A band drive actuator for a rotating recording medium comprises a relatively friction free rolling suspension to guide the head/carriage assembly for translational movement radially relative to the recording medium, by positioning a pre-loaded bearing on one side of a carriage and straddling it with a fixed bearing and a capstan surrounded band drive on the opposite side of this carriage.

7 Claims, 4 Drawing Figures

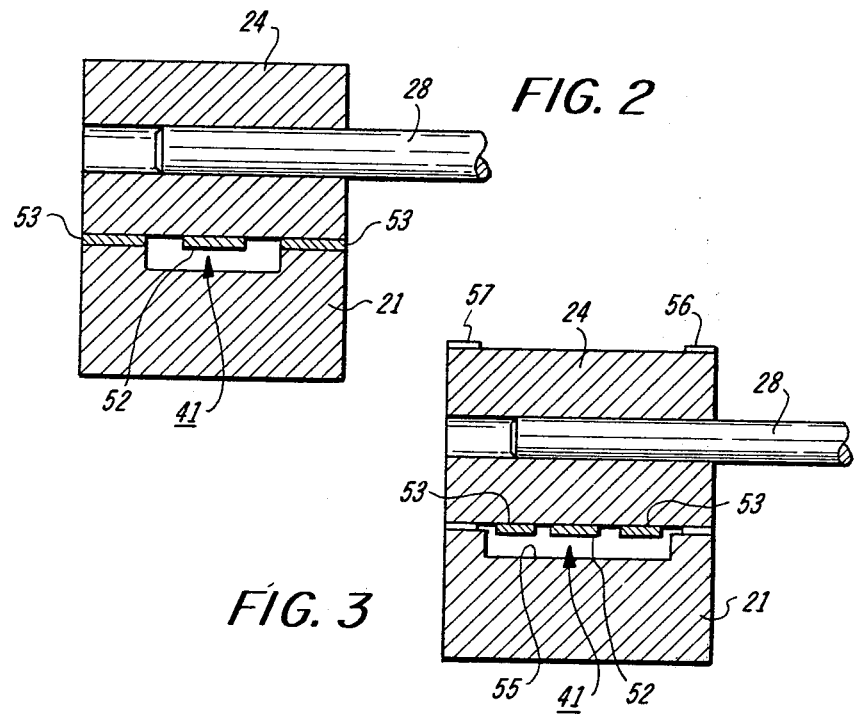
FIG. 2
FIG. 3
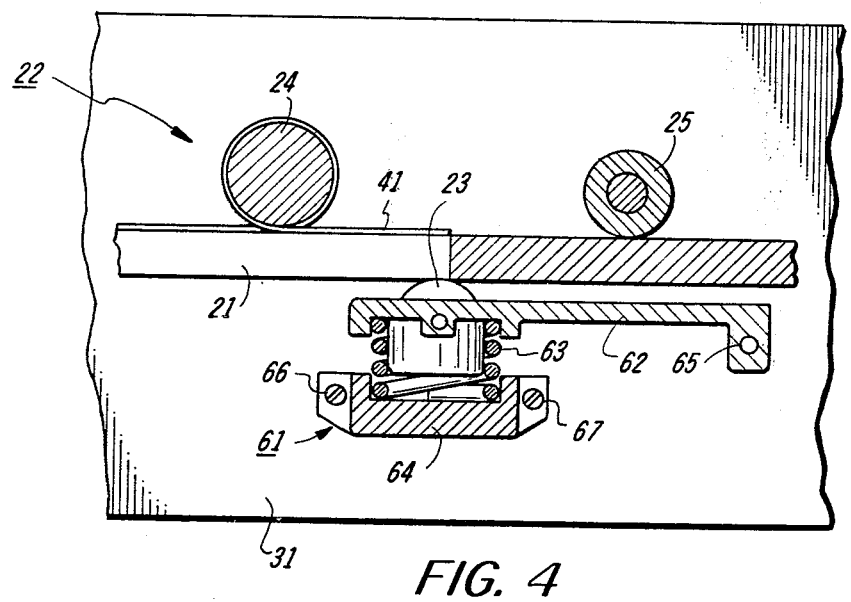
FIG. 4

BAND DRIVE ACTUATOR

This is a contination of application Ser. No. 100,580 filed Dec. 5, 1979, and now abandoned.

BACKGROUND OF THE INVENTION

This invention relates to head positioning mechanisms for rotating memories and, more particularly, to band drive actuators for rotating magnetic memories and the like.

Rotating memories, such as rigid and floppy disk drives, usually have a head positioning mechanism (commonly referred to as an "actuator") for selectively repositioning one or more read/write heads radially relative to a rotating recording medium so that data may be transferred to or from any selected one of a plurality of concentric data tracks on the recording medium. Band drive actuators have been successfully employed, especially in floppy disk drives which have traditionally been able to accommodate relatively large head positioning errors. Now, however, floppy disk drives and other lower cost rotating memories are being designed to obtain increased track densities. Consequently, increased head positioning accuracies are being required.

Prior band drive actuators have typically included a head/carriage assembly which is mounted for sliding movement on a guide rail. In such an actuator, a nonextensible tensioned band is wrapped around and secured to a capstan which, in turn, is pinned to the output shaft of, say, a drive motor. Moreover, the opposite ends of the band extend in opposite directions from the capstan and are fastened to spaced apart points on the head/carriage assembly so that the head/carriage assembly moves back and forth on the guide rail depending on the direction of rotation of the capstan. See, for example, U.S. Pat. No. 4,161,004, which issued July 10, 1979 for a "Head Positioning Mechanism for Recording/Playback Machine".

Unfortunately, the sliding friction between the head/carriage assembly and the guide rail creates a mechanical hysteresis which limits the head positioning accuracy that can be achieved with a conventional band drive actuator. Accordingly, relatively complex and expensive actuators having precision ball bearing supported head/carriage assemblies are still widely utilized, even though they classically require six or so precision ball bearings and several fixed precision rail surfaces.

SUMMARY OF THE INVENTION

This invention provides a band drive actuator which is relatively friction free. In other words, the actuator of this invention combines the economic and fabrication advantages of a band drive actuator with the head positioning accuracy advantages of a precision ball bearing actuator.

To carry out the present invention, the read write head or heads of a memory having a rotating recording medium are mounted on a carriage which is guided by a three member rolling suspension for translational movement radially relative to the recording medium. The suspension includes a capstan which is pinned to the drive shaft of a precision bearing stepper motor and constrains the carriage against rotational movement about the roll, pitch and yawl axes. Moreover, the suspension is oriented to constrain the carriage against translational movement in a direction normal to the plane of the recording medium.

To translate the carriage radially relative to the recording medium under the control of the stepping motor, a nonextensible, tensioned band having substantial shear strength and stiffness is wrapped around and secured at an intermediate point to the capstan. The ends of the band extend in opposite directions from the capstan and are secured to spaced apart points on the carriage. The shear strength and stiffness of the band constrains the carriage against translational movement tangentially relative to the recording medium. If the band breaks or otherwise fails, there is no risk of a catastrophic head crash because the suspension will still constrain the carriage against translational movement toward or away from the recording medium.

BRIEF DESCRIPTION OF THE DRAWINGS

Still further objects and advantages of the invention will become apparent when the following detailed description is read in conjunction with the attached drawings, in which:

FIG. 2 is a fragmentary cross-sectional view of the carriage, band and capstan shown in FIG. 1;

FIG. 3 is similar to FIG. 1, but illustrates an alternative carriage and capstan; and FIG. 4 is a sectional view of a bracket for the preload bearings of the actuator.

DETAILED DESCRIPTION OF THE ILLUSTRATED EMBODIMENTS

Figure 1:
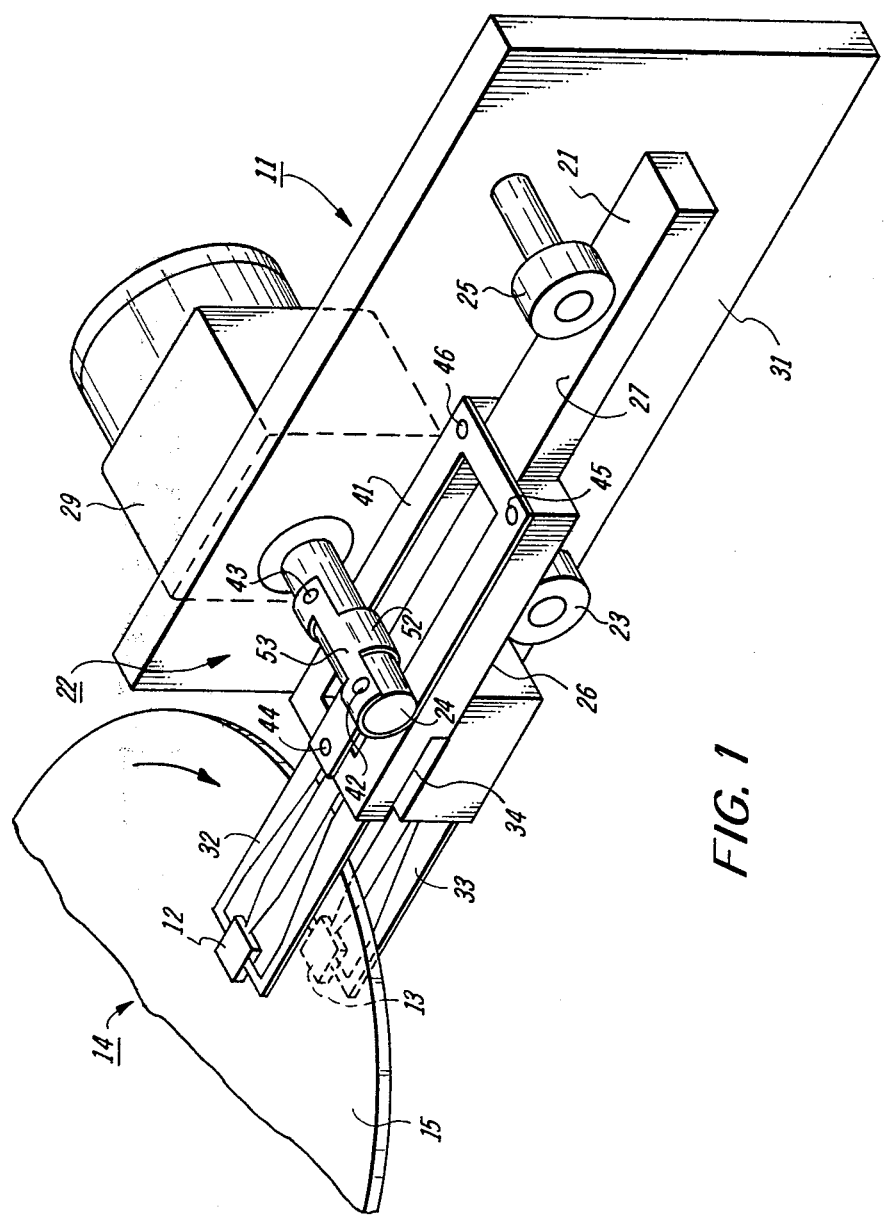
FIG. 1 is a simplified schematic view of an actuator constructed in accordance with the present invention.

While the invention is described in some detail hereinbelow with reference to certain embodiments, it is to be understood that there is no desire to limit to those embodiments. On the contrary, the intent is to cover all modifications, alternatives and equivalents falling within the spirt and scope of the invention as defined by the appended claims.

Turning now to the drawings, and at this point especially to FIG. 1, there is an actuator 11 for selectively repositioning the read/write heads 12 and 13 of a rotating memory 14 (shown only in relevant part) radially relevant to a recording medium 15. As shown, the memory 14 is a single platter, double sided, rigid magnetic disk drive. Thus, the recording medium 15 is a rigid disk which is coated with a magnetic oxide, and the read/write heads 12 and 13 are flying heads which are disposed on opposite sides of the recording medium 15. Moreover, in operation, the recording medium 15 is rotated (by means not shown) at a substantially constant angular velocity in the direction of the arrow, and the read/write heads 12 and 13 are selectively positioned and addressed so that data may be transferred to or from any selected one of the data tracks on either side of the recording medium 15.

It will be seen that the actuator 11 provides failsafe protection against potentially catastrophic head crashes, which is a vitally important feature for rigid magnetic disk drives. Nevertheless, it will be evident that the broader aspects of this invention are applicable to rotating memories in general, including single and double sided floppy disk drives and single and multiple platter, single and double sided rigid disk drives.

In accordance with the present invention, the actuator 11 has a carriage 21 which is guided for translational movement radially relative to the recording medium 15 by a nearly frictionless rolling suspension 22 comprising a precision preload bearing 23, a capstan 24 and a precision positioning bearing 25. The suspension 22 constrains the carriage 21 against movement toward or away from the recording medium. To that end, the preload bearing is an outer race rotation ball bearing which is biased against a substantially flat reference surface 26 on the bottom of the carriage so that a parallel rail surface 27 on the top of the carriage 21 is loaded against the capstan 24 and the positioning bearing 25. The capstan 24 is pinned or otherwise secured to the drive shaft 28 of a precision bearing stepper motor 29, and the positioning bearing 25 is an outer race rotation ball bearing which is seated on a mounting plate 31. As described in more detail hereinbelow, the capstan 24 and the positioning bearing 25 are tangentially aligned to maintain the carriage 21 in a plane which is parallel to the nominal plane of the recording medium 15.

It will be noted that the preload bearing 23 is disposed between the capstan 24 and the positioning bearing 25 along the path of movement of the carriage 21. Therefore, the load forces acting on the capstan 24 and the positioning bearing 25 are essentially independent of the position of the carriage 21. Indeed, the preload bearing 23 is preferably located approximately midway between the capstan 24 and the positioning bearing 25 so that the load forces applied thereto are more or less equal.

As shown, the read/write heads 12 and 13 are mounted on flexures 32 and 33, respectively, which extend from the forward end of the carriage 21. Advantageously, to limit the accumulation of tolerance errors, the flexure 33 for the lower head 13 is seated on the carriage reference surface 26 and the flexure 32 for the upper head 12 is seated on a machined pocket 34 formed in the carriage 21.

In operation, the read/write heads 12 and 13 are selectively repositioned radially relative to the recording medium 15 under the control of the stepper motor 29. To accomplish that, there is a flexible, nonextensible, tensioned band 41 which is wrapped once around the capstan 24. An intermediate section of the band 41 is pinned to the capstan 24, as at 42 and 43, and the ends of the band 41 extend substantially tangentially in opposite directions from the capstan 24 and are pinned, as at 44–46, to spaced apart points on the carriage 21. Suitably, the band 41 is a single thin metallic strip having a narrow elongated tongue 52 which fits through a slot in a wider elongated slotted section 53. Alternatively, the band 41 may be fabricated by using one web to form the tongue 52 and two other webs to form the slotted section 53. In either event, the band 41 should have substantial shear strength and stiffness to constrain the carriage 21 against movement tangentially of the recording medium 15. For that reason, a stainless steel band 41 having a thickness of about two or three mils is preferred.

Referring to FIG. 2, it will be seen that the carriage 21 may bear against the band 41. Preferably, however, as shown in FIG. 3, the carriage 21 is centrally relieved along the length, as at 55 and/or inboard and outboard steps 56 and 57, respectively, are formed on the capstan 24 to provide a clearance for the band 41.

Turning to FIG. 4, the preload bearing 23 is suitably journalled for rotation in a spring biased bracket 61. As illustrated, the bracket 51 comprises an elongated, flexible support arm 62 for the preload bearing 23, a compression spring 63 which biases the preload bearing 23 against the reference surface 26 of the carriage 21, and a retaining cap 64 which holds the compression spring 27 in place. The support arm 62 is pivotally secured to the mounting plate 31 as at 65, and the cap 64 is rigidly fastened to the mounting plate 31 as at 66 and 67. Due to the flexibility of the support arm 62, the preload bearing 23 is self aligning about its yawl axis.

CONCLUSION

In view of the foregoing, it will now be evident that this invention provides a relatively friction free band drive actuator for rotating memories. As a result, the actuator offers greater head positioning accuracy than prior band drive actuators. Moreover, it will be understood that the increased positioning accuracy is achieved without significantly increasing the cost of complexity of the actuator as compared with other actuators of this same general type.

What is claimed is:

1. An actuator for a disk drive having a rotating recording medium, said actuator comprising the combination of
    a head/carriage assembly;
    a rolling suspension means for supporting said head/carriage assembly and for guiding said head/carriage assembly for translational movement radially relative to said recording medium; said suspension means including a capstan, a fixed precision positioning bearing, and a spring biased preload bearing; said preload bearing being biased against a substantially flat surface on one side of said said head/carriage assembly to load a parallel surface on the opposite said of said head/carriage assembly against said capstan and said positioning bearing, whereby said suspension means constrains said head/carriage assembly against movement toward and away from said recording medium;
    a precision bearing motor coupled to said capstan;
    a nonextensible, tensioned band wrapped around said capstan, said band being secured at an intermediate point along its length to said capstan and having a pair of ends extending substantially tangentially in opposite directions from said capstan, the ends of said band being secured to spaced apart points on said head/carriage assembly, whereby said head/carriage assembly moves radially of said recording medium under the control of said motor, and
    wherein said preload bearing is disposed between said capstan and said positioning bearing lengthwise of said head/carriage assembly whereby the load forced applied to said capstan and said positioning bearing are substantially independent of the position of said head/carriage assembly radially relative to said recording medium.

2. The actuator of claim 1 wherein said preload bearing is journalled for rotation in a bracket having an elongated flexible support arm, whereby said preload bearing is self aligning about its yawl axis under the influence of the spring bias applied thereto.

3. The actuator of claim 1 wherein said capstan is configured to provide a clearance between said band and said head/carriage assembly.

4. The actuator of claim 3 wherein
    said band is a thin, flexible member which is wrapped once around said capstan; and
    said band is secured to said head/carriage assembly in a plane parallel to said recording medium and has sufficient shear strength to constrain said head/carriage assembly against movement tangentially of said recording medium.

5. The actuator of claim 1 wherein said preload bearing is approximately midway between said capstan and said positioning bearing, whereby said load forces are substantially equal.

6. The actuator of claim 1 wherein
said disk drive is a rigid disk having at least one recording platter; and
said head/carriage assembly includes at least one read/write head; and further including
a flexure secured to the reference surface of said head/carriage assembly for supporting said head.

7. The actuator of claim 6 wherein
said band is secured to said head/carriage assembly in a plane parallel to said recording medium and has sufficient shear strength to constrain said head/carriage assembly against movement in a direction tangential to said recording medium; and
said motor is a stepping motor.

* * * * *